(12) United States Patent
Fink et al.

(10) Patent No.: US 6,716,475 B1
(45) Date of Patent: Apr. 6, 2004

(54) BIOCOMPATIBLE PHOTONIC CRYSTALS

(75) Inventors: Yoel Fink, Cambridge, MA (US); John D. Joannopoulos, Belmont, MA (US); Edwin L. Thomas, Natick, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/527,579

(22) Filed: Mar. 16, 2000

Related U.S. Application Data

(60) Provisional application No. 60/125,206, filed on Mar. 18, 1999.

(51) Int. Cl.$^7$ ................................................. A23G 3/00
(52) U.S. Cl. ...................... 426/660; 426/250; 117/65; 205/79; 205/305
(58) Field of Search .................... 426/660, 250; 117/65; 205/79, 317

(56) References Cited

U.S. PATENT DOCUMENTS

| | | |
|---|---|---|
| 4,643,894 A | 2/1987 | Porter et al. |
| 5,622,690 A | 4/1997 | Potter et al. |
| 5,846,595 A * | 12/1998 | Sun et al. ............... 427/2.14 |
| 6,344,272 B1 * | 2/2002 | Oldenburg et al. ......... 428/403 |
| 6,409,907 B1 * | 6/2002 | Braun et al. ............ 205/317 |
| 6,436,187 B1 * | 8/2002 | Patel et al. ............... 117/68 |
| 6,530,944 B2 * | 3/2003 | West et al. ............... 607/88 |

FOREIGN PATENT DOCUMENTS

WO    WO 98/56854    12/1998

* cited by examiner

Primary Examiner—N. Bhat
(74) Attorney, Agent, or Firm—Gauthier & Connors LLP

(57) ABSTRACT

A materials system or dielectric structure, for example a photonic crystal, of the invention includes a plurality of materials that are biocompatible. The materials have different indices of refraction for the wavelength of operation and are assembled into a dielectric structure having a photonic band gap in one or more directions. The assembly process yields a structure with a particular spatial arrangement of materials with different indices of refraction which is completely biocompatible and has the property of reflecting light at a particular predetermined range of frequencies, as well as other properties associated with photonic band gaps. These structures can exhibit photonic band gaps that can be engineered to be broad or narrow and be centered on different parts of the spectrum UV, visible IR or longer wavelengths. The materials used can have microwave transparency or be made to reflect microwaves. Possible applications include edible reflectors for visible to impart a particular color to the food or specular appearance, heat shields to minimize radiative and evaporative and convective heat losses, and as a UV protection layer.

16 Claims, 1 Drawing Sheet

BIOCOMPATIBLE PHOTONIC CRYSTALS

PRIORITY INFORMATION

This application claims priority from provisional application Ser. No. 60/125,206 filed Mar. 18, 1999.

This invention was made with government support under Grant No. DAAG55-97-1-0366 awarded by the Army Research Office and Grant Numbers F49620-97-1-0325 and F49620-97-1-385 awarded by the Air Force. The government has certain rights in the invention.

BACKGROUND OF THE INVENTION

The invention relates to the field of dielectric structures also known as photonic crystals, and in particular to structures with high reflectivity characteristics that are made of biocompatible materials. Biocompatibility is defined as any material that can come in contact with at least one part of the body without causing significant health hazards. For example, an edible material is a subset of the biocompatible materials since it could come in contact with the digestive system without causing significant health hazards. Further examples include metabolizable materials, injectable materials or material which are introduced to the body via bodily systems, e.g., respiratory, epidermal, etc.

Dielectric structures can have a variation in the index of refraction in one, two or three directions. Depending on the details of the structure, one can form photonic band gaps in one or more directions. Devices that have photonic band gaps are used in a wide variety of optical devices that typically utilize the frequency selective reflectivity that these structures exhibit. The simplest system being a multilayer film, including for example various three dimensional arrangements of spheres and other arrangements of dielectric media. A comprehensive theory on the optical properties of these dielectric structures has been published (see Joannopoulos et al., *Photonic Crystals Molding the Flow of Light*, Princeton University Press, 1995).

SUMMARY OF THE INVENTION

The materials system or dielectric structure, for example photonic crystal, of the invention includes a plurality of materials that are biocompatible. The materials have different indices of refraction for the wavelength of operation and are assembled into a dielectric structure having a photonic band gap in one or more directions. The assembly process yields a structure with a particular spatial arrangement of materials with different indices of refraction which is completely biocompatible and has the property of reflecting light at a particular predetermined range of frequencies, as well as other properties associated with photonic band gaps. These structures can exhibit photonic band gaps that can be engineered to be broad or narrow and be centered on different parts of the spectrum UV, visible IR or longer wavelengths. The materials used can have microwave transparency or be made to reflect microwaves. Possible applications include edible reflectors for visible to impart a particular color to the food or specular appearance, heat shields to minimize radiative and evaporative and convective heat losses, and as a UV protection layer.

DETAILED DESCRIPTION OF THE INVENTION

In the following description of the invention examples of multilayer film structure will be utilized for illustration and simplicity since the optical properties of this structure can be analyzed analytically. Most of the current applications involving the multilayer film utilize the reflection or transmission of light of nearly normal incidence, although grazing angle applications exist as well. The optical response of a multilayer dielectric film to light of off-normal incidence has been investigated, and is angle-of-incidence and polarization dependent. If properly constructed, a multilayer dielectric film will have selective frequencies regions of high and low reflectivity. Making the film out of biocompatible articles will allow for the construction of a biocompatible reflector.

The materials system which will make up the dielectric structure, e.g., photonic crystal, of the invention includes one or more biocompatible materials thereof, such as but not limited to starch, cellulose, polylactic acid, polymethyl methacrylate, polyacrylic acid and carbohydrates. The materials are assembled into a structure with a spatial variation of the index of refraction that can be in one, two or three directions. For simplicity and purposes of illustration, the invention will be described in the context of a multilayer film, though other types of structures are possible. To enhance the dielectric contrast between the layers, one can add a compatible high index of refraction filler component, such as but not limited to titania ($TiO_2$)

Figure 1:
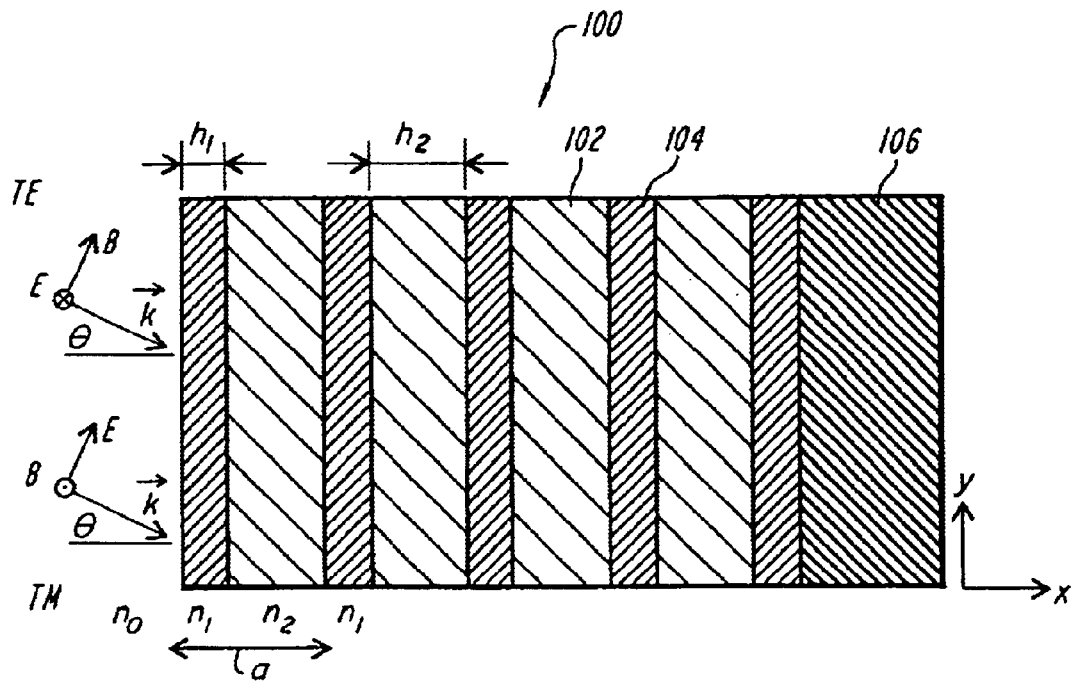
FIG. 1 is a simplified block diagram of an exemplary embodiment of a multilayer dielectric film structure in accordance with the invention.

FIG. 1 is a simplified block diagram of an exemplary embodiment of a multilayer dielectric film structure 100 in accordance with the invention. The structure 100 includes alternating layers of a first material 102 of a biocompatible material with an index of refraction $n_2$ and thickness $h_2$, and a second material 104 of a biocompatible high index refraction component $n_1$ and thickness $h_1$ on a substrate 106. Also shown in FIG. 1 are the incident wave vector k originating from the ambient medium $n_0$ and the electromagnetic mode convention TM and TE.

In applications involving the use of the structure 100 for reflecting purposes, it will be appreciated that all of the individual film materials used have some degree of transparency for the wavelength (frequency) range of interest. The compatibility of the materials is taken in the broadest sense subject to the proximity imposed by the structure and the particular method of assembly. The two (or more) components will also have chemical compatibility, i.e., the materials will not degrade when in contact with one another, and physical compatibility.

The layers can be assembled on a substrate and subsequently removed or coated directly onto a surface that is part of the application. The surface should be wetted by the material that forms the first layer. The substrate can be treated with a surface modifying group for good adherence or easy removal of the assembled structure. An exemplary assembly of layers which can be subsequently removed includes a glass surface coated initially with Victawet (sodium salt of 2-ethylhexyl acid phosphate provided by SPI Inc.), and then sequentially layered with die selected materials. After assembly, the dielectric multilayer film can be removed from the Victawet coated glass substrate by using water, which will not damage a hydrophobic polymer.

Polymers are presented to illustrate deposition techniques of other nonpolymeric materials can be used. Polymer layers of controlled thickness can be deposited by a variety of known techniques, for example, spraying or by dip coating a polymer layer from a solvent such as water. The concentration of the solution and the dip rate can be used to control thickness. Evaporation casting can be also used to deposit polymer layers. In this technique a dilute solution of the polymer is prepared, which is then cast on the surface. A polymer layer can also be deposited by heat or vacuum evaporation or by spraying onto a surface. In the assembly process, care should be taken to prevent damage of underlying layers by the presence of solvent, in general a technique which involves a minimal presence of solvent such as spin coating is preferable.

The optical response of a particular dielectric multilayer film can be predicted using the characteristic matrix method as described in Driscoll et al., *Handbook of Optics*, McGraw-Hill 8-42–8-43 (1978), incorporated herein by reference. In this method, a 2×2 unitary matrix is constructed for each layer of the structure. This matrix represents a mapping of the field components from one side of the layer to the other. To successfully predict the optical response of a multilayer film, the characteristic matrix for each layer needs to be calculated. The form of the characteristic matrix for the $j^{th}$ layer is $$m^g(\theta)_j = \begin{bmatrix} \cos\beta_j & -\frac{i}{p_j^g}\sin\beta_j \\ -ip_j^g\sin\beta_j & \cos\beta_j \end{bmatrix} \quad (g = TE, TM)$$

$$\beta_j = kh_j\sqrt{n_j^2 - snell(\theta)^2}$$

$$snell(\theta) = n_0\sin\theta_0$$

$$p_j^g = \begin{cases} \sqrt{n_j^2 - snell(\theta)^2} & g = TE \\ \frac{\sqrt{n_j^2 - snell(\theta)^2}}{n_j^2} & g = TM \end{cases}$$

where $n_j$ is the index of refraction, $h_j$ is the thickness of the $j^{th}$ layer, $\theta_0$ is the angle between the incident wave and the normal to the surface, and no is the index of the external medium, e.g., air.

The matrices are then multiplied to give the film's characteristic matrix $$M^g(\theta) = \prod_{j=1}^{N} m_j^g \quad (g = TM \text{ or } TE)$$

which in turn can be used to calculate the reflectivity for a given polarization and angle of incidence, $$R^g(\theta) = \left| \frac{(M_{11}^g(\theta) + M_{12}^g(\theta)p_1^g)p_0^g - (M_{21}^g(\theta) + M_{22}^g(\theta)p_1^g)}{(M_{11}^g(\theta) + M_{12}^g(\theta)p_1^g)p_0^g + (M_{21}^g(\theta) + M_{22}^g(\theta)p_1^g)} \right|^2$$

where $p^g_0$ contains information about the index of the medium and angle of incidence on one side of the multilayer film and $p^{-g}_1$ contains information about the index of the medium and angle of incidence on the other.

In certain embodiments, a finite periodic film consisting of alternating layers of materials with different indices of refraction is formed which exhibits high reflectivity for a particular range of frequencies determined by the respective thickness of the layers and their indices of refraction. The center frequency of the high reflectivity region at a particular angle of incidence $\theta$ is given by $$\omega_{midgap}^g(\theta) = \frac{c}{h_2\sqrt{n_2^2 - snell^2(\theta)} + h_3\sqrt{n_3^2 - snell^2(\theta)}}$$

$$\left\{ \cos^{-1}\left(1 - \sqrt{\frac{\Lambda^g(\theta) - 1}{1 + \Lambda^g(\theta)}}\right) + \cos^{-1}\left(+\sqrt{\frac{\Lambda^g(\theta) - 1}{1 + \Lambda^g(\theta)}}\right) \right\}$$

The extent in frequency of this region for a given angle of incidence $\theta$ and at a particular polarization g is given by $$\Delta\omega^g(\theta) = \frac{2c}{h_2\sqrt{n_2^2 - snell^2(\theta)} + h_3\sqrt{n_3^2 - snell^2(\theta)}}$$

$$\left\{ \cos^{-1}\left(-\sqrt{\frac{\Lambda^g(\theta) - 1}{1 + \Lambda^g(\theta)}}\right) - \cos^{-1}\left(+\sqrt{\frac{\Lambda^g(\theta) - 1}{1 + \Lambda^g(\theta)}}\right) \right\}$$

where $$\Lambda^g(\theta) = \frac{1}{2}\left(\frac{p_2^g}{p_3^g} + \frac{p_3^g}{p_2^g}\right)$$

$n_2$, $n_3$ are the indices of refraction of the two layers repeated throughout the structure, $h_2$, $h_3$ are their thicknesses, and c is the speed of light in vacuum.

Figure 2:
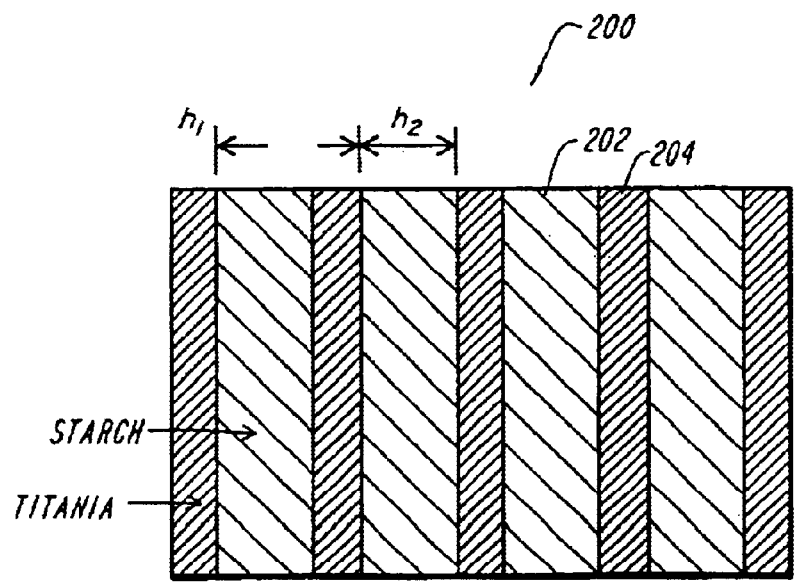
FIG. 2 is a simplified block diagram of an exemplary embodiment of a multilayer dielectric film structure including alternating layers of a starch polymer and titania ($TiO_2$) in accordance with the invention.

FIG. 2 is a simplified block diagram of an exemplary embodiment of a multilayer dielectric film structure 200 in accordance with the invention. The structure 200 includes alternating layers of a starch polymer layer 202 and a titania layer 204. The polymer exhibits low loss in the 0.35–3 micron range, and forms continuous ultra smooth films. The index of refraction for the polymer is very close to 1.5 across the entire frequency range of interest.

As a first exemplary example, in order to create an edible photonic crystal coating on a candy bar, one will take an aqueous solution of starch (~2weight percent) and an aqueous solution of titania particles in sugar (20–80 nm, 50:50 sugar titania ratio total solids 2.5% weight in diameter) and dip the candy bar into both solutions alternately 25 times in each solution. The resulting structure will be a 50 layer edible photonic crystal. The concentration of the solutions can be varied to include solutions of 3%, 5% and 10% solid concentration, and a dipping sequence which would start by alternating between two solutions one of sugar + titania of 2.5% concentration with starch 2.5% for 20 dippings, then move to the 3% concentration pair for 20 dippings and then to the 10%. It will be appreciated that the foregoing are just examples and that other concentrations are possible. The effect would be to build a super stack broad band reflector by connecting stacks of different characteristic periodicity.

A second exemplary example involves the synthesis of sugar spheres in the 0.25–0.5 micron size range and the subsequent arrangement into closed packed lattice. These structures can exhibit photonic band gaps that can be engineered to be broad or narrow and be centered on different parts of the spectrum UV, visible IR or longer wavelengths. The materials used can have microwave transparency or be made to reflect microwaves. Possible applications include edible reflectors for visible light to impart a particular color to the food or specular appearance, heat shields to minimize radiative and evaporative and convective heat losses, and as a UV protection layer. These are examples that are given as illustration and are not comprehensive.

Although the present invention has been shown and described with respect to several preferred embodiments thereof, various changes, omissions and additions to the form and detail thereof, may be made therein, without departing from the spirit and scope of the invention.

What is claimed is:

1. A biocompatible photonic crystal comprising a multilayered structure of a plurality of biocompatible materials that are assembled to have a spatial variation of index of refraction that is in one or more directions, wherein at least one of said biocompatible materials is digestible.

2. The photonic crystal of claim 1, wherein at least one of said materials are metabolizable.

3. The photonic crystal of claim 1, wherein said materials comprise different indices of refraction for a defined frequency range of operation.

4. The photonic crystal of claim 3, wherein said structure is repetitive in indices of refraction along one or more directions.

5. The photonic crystal of claim 1, wherein at least one of said materials comprise a degree of transparency at a defined frequency range of operation.

6. The photonic crystal of claim 5, wherein at least one of said materials are transparent in the microwave regime.

7. The photonic crystal of claim 1, wherein at least one of said materials comprises starch, cellulose, polyactic acid polymethyl methacrylate, polyacrylic acid or carbohydrates.

8. The photonic crystal of claim 1, wherein at least one of said materials comprises titania.

9. The photonic crystal of claim 1, wherein said titania has a degree of transparency at a defined frequency range of operation.

10. The photonic crystal of claim 1, wherein said structure is highly reflective for a defined frequency range of operation.

11. The photonic crystal of claim 1, wherein at least one of said materials are absorbing within a defined frequency range of operation.

12. The photonic crystal of claim 1, wherein said structure comprises a coating.

13. The photonic crystal of claim 1, wherein said structure selectively reflects desired frequency ranges in at least one direction.

14. A biocompatible structure comprising a multilayered structure that includes plurality of biocompatible materials that are arranged to define a photonic crystal.

15. A biocompatible coating comprising a photonic crystal structure that includes a multilayered structure having a plurality of biocompatible materials.

16. A piece of candy comprising a photonic structure that includes a multilayered structure having a plurality of biocompatible materials that are assembled to have a spatial variation of index of refraction that is in one or more directions.

* * * * *